United States Patent
Plonk et al.

(10) Patent No.: US 11,091,882 B2
(45) Date of Patent: Aug. 17, 2021

(54) EDGE WEATHER ABATEMENT USING HYPERLOCAL WEATHER AND TRAIN ACTIVITY INPUTS

(71) Applicants: Daniel W. Plonk, Atlanta, GA (US);
Mike Vawter, Dearborn, MI (US);
Greg Temple, Hammond, IN (US)

(72) Inventors: Daniel W. Plonk, Atlanta, GA (US);
Mike Vawter, Dearborn, MI (US);
Greg Temple, Hammond, IN (US)

(73) Assignee: NORFOLK SOUTHERN CORPORATION, Norfolk, VA (US)

( * ) Notice: Subject to any disclaimer, the term of this patent is extended or adjusted under 35 U.S.C. 154(b) by 0 days.

(21) Appl. No.: 16/791,318

(22) Filed: Feb. 14, 2020

(65) Prior Publication Data
US 2020/0263362 A1      Aug. 20, 2020

Related U.S. Application Data

(60) Provisional application No. 62/805,437, filed on Feb. 14, 2019.

(51) Int. Cl.
*E01B 7/24*      (2006.01)
*G05B 13/04*      (2006.01)

(52) U.S. Cl.
CPC .............. *E01B 7/24* (2013.01); *G05B 13/048* (2013.01)

(58) Field of Classification Search
CPC ..................................... E01B 7/00; E01B 7/24
See application file for complete search history.

(56) References Cited

U.S. PATENT DOCUMENTS

| | | | | |
|---|---|---|---|---|
| 3,697,746 A | * | 10/1972 | Patterson .................. | E01B 7/24 246/428 |
| 4,195,805 A | * | 4/1980 | Keep, Jr. ................... | E01B 7/24 104/280 |
| 4,656,333 A | * | 4/1987 | Murphy .................... | E01B 7/24 219/209 |

(Continued)

OTHER PUBLICATIONS

Talbott, Rebecca; Railway Equipment Co.; "Wireless Snow Detection Systems" (https://www.rwy.com/products-rwy/track-heaters-accessories/accessories/snow-detection-systems/); dated Dec. 29, 2016; pp. 1-4; retrieved on Oct. 26, 2020; Railway Equipment Co. (Plymouth, MN).

(Continued)

*Primary Examiner* — Ronald D Hartman, Jr.
(74) *Attorney, Agent, or Firm* — Morris, Manning & Martin, LLP; Daniel E. Sineway

(57) ABSTRACT

Systems, devices, media, and methods are presented for controlling remote equipment in a network. A switch heater control system includes a weather modeling function. The system periodically obtains weather data according to a predetermined time interval. Based on the closest weather data set, the weather modeling function generates a hyperlocal forecast associated with each switch heater location. The system includes an active snowfall mode and a maintenance mode that controls heating based on an estimate of local snow depth, adjusted for wind conditions and passing trains. When the hyperlocal forecast indicates heating is required, the system calculates a melt duration, starts a timer, and transmits a start signal to the switch heater.

20 Claims, 13 Drawing Sheets

(56) References Cited

U.S. PATENT DOCUMENTS

| | | | |
|---|---|---|---|
| 5,389,766 A * | 2/1995 | Takahashi | E01B 7/24 |
| | | | 104/279 |
| 5,677,533 A | 10/1997 | Yaktine et al. | |
| 5,941,482 A * | 8/1999 | Santagata | E01B 7/24 |
| | | | 246/428 |
| 6,637,703 B2 | 10/2003 | Matheson et al. | |
| 6,768,551 B2 | 7/2004 | Mian et al. | |
| 6,995,666 B1 | 2/2006 | Luttrell | |
| 7,328,871 B2 | 2/2008 | Mace et al. | |
| 7,507,965 B2 | 3/2009 | Lane et al. | |
| 8,006,559 B2 | 8/2011 | Mian et al. | |
| 8,140,250 B2 | 3/2012 | Mian et al. | |
| 8,296,000 B2 | 10/2012 | Denny et al. | |
| 8,335,606 B2 | 12/2012 | Mian et al. | |
| 9,061,594 B2 | 6/2015 | Wesche et al. | |
| 9,134,185 B2 | 9/2015 | Mian et al. | |
| 9,151,681 B2 | 10/2015 | Arndt et al. | |
| 9,296,108 B2 | 3/2016 | Mian et al. | |
| 9,340,219 B2 | 5/2016 | Gamache et al. | |
| 9,376,129 B2 | 6/2016 | Hilleary | |
| 9,518,947 B2 | 12/2016 | Bartonek et al. | |
| 9,865,103 B2 | 1/2018 | Kraeling et al. | |
| 10,012,546 B2 | 7/2018 | Bartonek et al. | |
| 10,081,376 B2 | 9/2018 | Singh | |
| 10,136,106 B2 | 11/2018 | Shubs, Jr. et al. | |
| 10,196,078 B2 | 2/2019 | Shubs, Jr. et al. | |
| 10,710,615 B2 | 7/2020 | Georgeson et al. | |
| 2010/0238290 A1 | 9/2010 | Riley et al. | |
| 2013/0220991 A1 * | 8/2013 | Honeck | H02J 3/14 |
| | | | 219/483 |
| 2014/0183278 A1 * | 7/2014 | Michelsen | B05B 1/20 |
| | | | 239/282 |
| 2017/0082652 A1 | 3/2017 | Forsblom et al. | |
| 2018/0307253 A1 | 10/2018 | Weiler et al. | |
| 2019/0061791 A1 | 2/2019 | Yaktine et al. | |
| 2019/0094154 A1 | 3/2019 | Iler | |
| 2019/0106845 A1 * | 4/2019 | Clyne | H03K 7/08 |
| 2019/0235126 A1 | 8/2019 | Petruk et al. | |
| 2020/0256024 A1 * | 8/2020 | Krohn | E01B 7/20 |

OTHER PUBLICATIONS

Railway Equipment Co., "Instruction Manual for Digital Snow Detector System;" copyright 2010 and 2011; pp. 1-7; Railway Equipment Co. (Plymouth, MN).

Railway Equipment Co., "Product Catalog" for 2019; pp. 1-54; Railway Equipment Co. (Plymouth, MN).

* cited by examiner

Heater Location (Lat, Long, Elev) = 33.792173, -84.289726, 904.88

Heater Type = P (Propane)

Switch-Type Value (N) at Heater Location = 1 (Single Track)

Weather Station Location = 33.788638, -84.271272, 901.22

Audit Log 220

| Time | Heater Data | | Weather Data | | | |
|---|---|---|---|---|---|---|
| | Status | Trains | Snowfall Rate(SF) | Snow Depth Code(SDC) | Wind Speed | Temp (TMPF) |
| 1/31/2020 2:25:02 AM | | | L | 0 | 2 | 34 |
| 1/31/2020 2:40:02 AM | | 1 | | 0 | 2 | 32 |
| 1/31/2020 2:55:02 AM | | | L | 1 | 3 | 30 |
| 1/31/2020 3:10:02 AM | On | | M | 1 | 4 | 30 |
| 1/31/2020 3:25:02 AM | On | | L | 1 | 4 | 28 |
| 1/31/2020 3:50:02 AM | On | 1 | L | 1 | 2 | 28 |
| 1/31/2020 4:05:02 AM | On | | | 2 | 2 | 27 |

FIG. 5

EDGE WEATHER ABATEMENT USING HYPERLOCAL WEATHER AND TRAIN ACTIVITY INPUTS

CROSS REFERENCE TO RELATED APPLICATIONS

The present application claims the benefit of and priority to U.S. Provisional Application 62/805,437, filed Feb. 14, 2019, entitled "System and Methods for Automating the Operation of Winter Weather Abatement Equipment," which is incorporated herein by this reference in its entirety.

TECHNICAL FIELD

Examples set forth in the present disclosure relate generally to railway maintenance systems. More particularly, but not by way of limitation, the present disclosure addresses systems and methods of hyperlocal weather modeling and remotely controlling the operation of winter weather abatement equipment, such as railroad switch heaters.

BACKGROUND

A railroad switch is a mechanical assembly with moveable rails to guide the wheels of a train from one track to another. The moveable rails are powered by a switch motor, which is often controlled remotely by a dispatcher. A track consists of a pair of generally parallel rails, anchored to railroad ties and supported by ballast. A railroad switch can be used on a single track or multiple tracks. A crossover describes a pair of switches that operate with two tracks.

In winter weather conditions, snow and ice may accumulate on a railroad switch and prevent it from operating properly. Many modern rail systems include switch heaters to melt the snow and ice near the switch. Switch heaters are generally electric or gas-powered (propane, typically). When deciding whether to turn a switch heater on or off, dispatchers often rely on general weather reports and/or personnel stationed near a switch who can make a visual inspection. Because rail safety is always a primary concern, the switch heaters are often turned on sooner than necessary—and left on longer than necessary—to ensure proper and safe operation of the rail switch.

Excess heating of rail switches is inefficient, causing wasted energy and high energy costs. Long periods of use cause excess wear and tear on the heaters, requiring more frequent repairs and replacement. Requiring personnel to conduct more frequent visual switch inspections—and to make more frequent decisions about when a switch heater should be turned on or off—would be expensive, inefficient, and prone to human error.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 5 is an illustration of an example audit log, in accordance with some example implementations.

DETAILED DESCRIPTION

Figure 1:
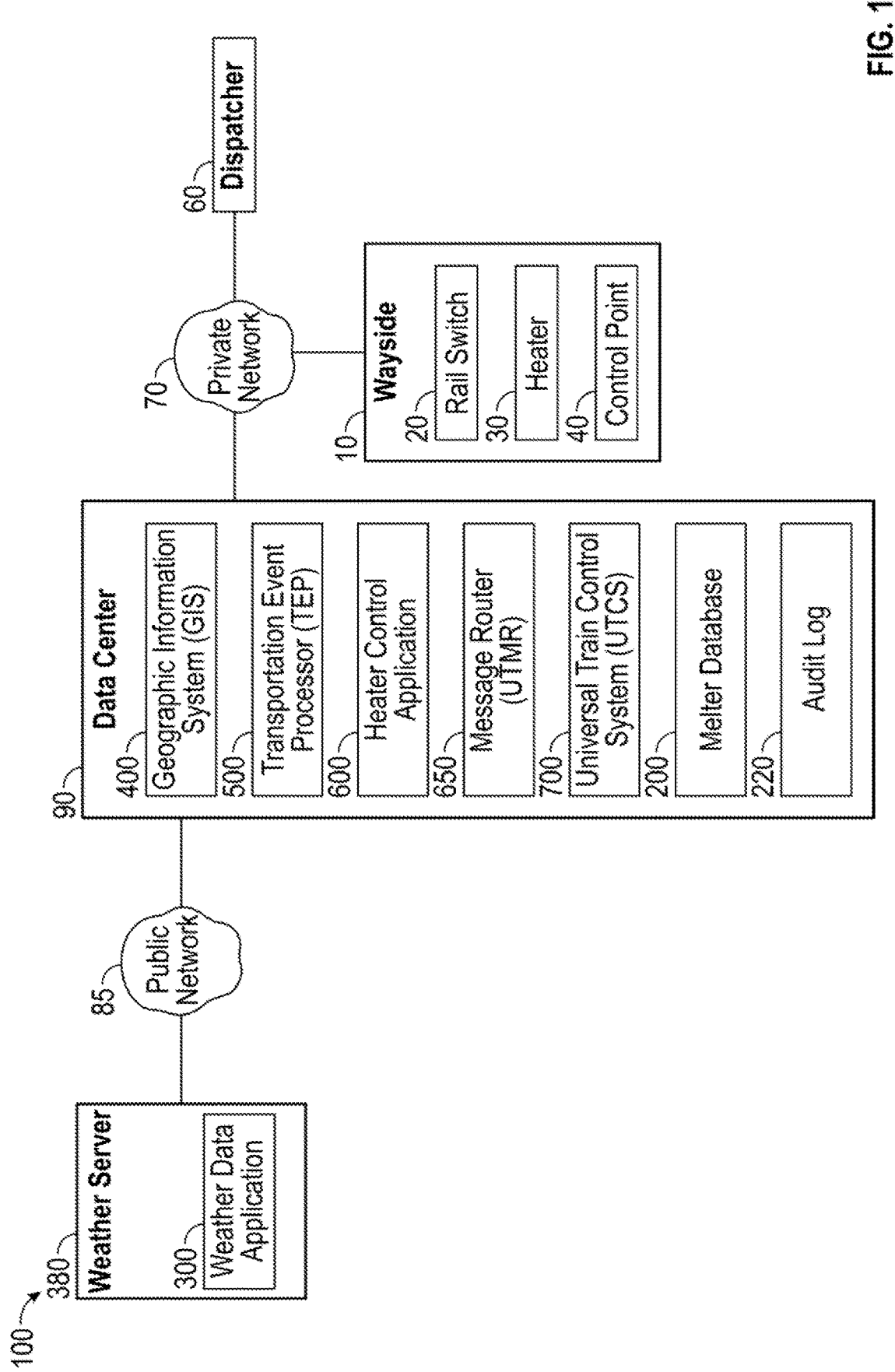
FIG. 1 is a block diagram of a system operated over one or more networks, in accordance with some example implementations.

Various implementations and details are described with reference to an example method of controlling remote equipment that includes selecting a first switch heater, obtaining a plurality of weather data sets, identifying the weather data from the station closest to the first switch heater, and transmitting a command signal to the first switch heater based on the closest weather data. In some implementations, the step of obtaining weather data includes sending a request to a third-party weather data application in a series, according to a predetermined time interval. The system includes a heater control application in communication with a plurality of remote switch heaters and comprising a weather modeling function and a melt duration function. The weather modeling function generates a local forecast associated with each switch heater. The melt duration function determines how long to operate each switch heater, according to its local forecast.

Although the various example and implementations are described with reference to a system for automating the operation of winter weather abatement equipment, the systems and methods described herein may be applied to and used with any of a variety of systems, especially those for monitoring and remotely controlling a large number of machines or equipment distributed over a wide network with precision and reliability.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value and/or to "about" another value. When such a range is expressed, it will be understood that the approximate range from the first value itself, to and including the end value itself, is part of another aspect or example. Similarly, when a value is expressed as an approximation, by use of the antecedent "about," it will be understood that the particular value itself is part of another aspect or example. It will be further understood that the endpoints of each of the ranges are significant, both in relation to the other endpoint and independently of the other endpoint.

As used herein, the terms "greater than" or "less than" a value should be understood to include another aspect or example in which the comparison includes "or equal to" the value. In other words, "greater than" means and includes "greater than or equal to" and "less than" means and includes "less than or equal to."

As used herein, the terms "optional" or "optionally" mean that the subsequently described event or circumstance may or may not occur, and that the description includes instances where said event or circumstance occurs and instances where it does not.

As used herein, the term "facilitate" means to aid, assist, or make easier. The term "impede" means to interfere with, hinder, or delay the progress.

FIG. 1 is a block diagram of a system 100, according to some examples, configured to remotely control the equipment located in an area near a railway, known as a wayside 10. According to the example shown, the system 100 includes a weather server 380, a data center 90, a dispatcher 60, and a wayside 10. A rail network, of course, may include one or more data centers 90 and dispatchers 60 working together to monitor, control, and otherwise manage a vast number of waysides 10 in a network. The waysides 10 may be located in remote areas far from a data center 90. The system 100, in some implementations, serves most or all waysides 10 in a network, including those located in remote areas at or near the edge of the network area.

The weather server 380 may be operated by a third party and may be connected via a public network 85, such as the internet, to the data center 90. The weather data application 300 may acquire and store weather data from a plurality of weather stations. The data center 90 may be protected by one or more firewalls and/or other network segmentation arrangements to improve security and support performance. The data center 90 may include one or more systems operated by a rail system for processing, monitoring, dispatching, and otherwise controlling rail traffic in a network. One or more remotely located dispatchers 60 may be connected to the data center 90 via a private network 70, such as a privately controlled wide-area network (WAN) protected by one or more firewalls and/or other network segmentation arrangements to improve security and support performance. The equipment at one or more waysides 10 may also be connected to the data center 90 via a private network 70, as shown.

As shown in FIG. 1, a wayside 10 may include a rail switch 20, a switch heater 30 (sometimes called a melter), and a control point 40. The control point 40, in some implementations, includes a variety of switch control systems, communications equipment, and sensors, including for example a train sensor. The train sensor at the control point 40 may be configured to sense the presence or absence of a passing train. In some implementations, the train sensor at the control point 40 gathers data including the time when a train starts to pass the control point 40, the velocity of the train, and the length of the train.

The rail switch 20, heater 30, and control point 40 (including the train sensor), in some implementations, are in communication directly with the Universal Train Control System (UTCS) 700 in the data center 90. The switch 20 may be configured to communicate its current state to the data center 90, and to receive command signals from the data center 90. Similarly, the heater 30 may be configured to communicate its current state (on or off, for example) to the data center 90, and to receive command signals from the data center 90.

The wayside 10 may include other equipment, such as one or more cameras to allow visual observations of the weather, the equipment, nearby personnel, or other conditions in and around the wayside 10. For example, photographs or video obtained by a field camera may be useful to a dispatcher, system administrator, or other personnel to verify or otherwise confirm conditions in the field.

Switch heaters 30 are typically powered by electricity or gas. Some types of electric heaters 30 generate radiant heat on or near the switch 20, to melt snow and ice or other accumulated precipitation, such as the CALROD brand industrial heaters offered by WATTCO which are available in a variety of shapes and sizes. Both electric and gas-powered heaters 30 may generate heated air that is blown through a duct or nozzle directly onto the switch 20.

The data center 90, as shown, includes an infrastructure to facilitate the computer-assisted dispatching of trains, including a Geographic Information System (GIS) 400, a Transportation Event Processor (TEP) 500, a Universal Train Control System (UTCS) 700, and a Universal Train Message Router (UTMR) 650. As described herein, the data center 90 also includes a heater control application 600 and access to one or more supporting databases, including a melter database 200 and an audit log 220.

The Geographic Information System (GIS) 400, in some example implementations, is configured to capture, store, analyze, and manage geographic data about locations, including presenting and displaying such data on maps. The GIS 400 may include location information (latitude, longitude, and elevation, for example) about every switch 20, heater 30, control point 40, or other type of operating station throughout the rail network. In some networks, the GIS 400 includes, processes, and manages information about tens of thousands of operating stations. The GIS 400 may also include software applications, APIs, and other tools that allow users to create and send queries, read the data, update or delete the data, execute searches, and otherwise interact with the geographic data. According to some example implementations, the GIS 400 is involved in sending the call for weather data (at a predetermined time interval) to the weather data application 300, and in receiving the weather data set in return.

The Transportation Event Processor (TEP) 500, in some example implementations, is configured to operate as a centralized repository and processor for all the elements in the data center 90 via an enterprise service bus (ESB). The TEP 500 manages and processes real-time data, in coordination with map data from the GIS 400, using the Universal Train Message Router (UTMR) 650 to compose and send messages in a queue to the Universal Train Control System (UTCS) 700 which, in turn, sends control and command signals to thousands of operating stations, including waysides 10, in the rail network. The TEP 500 facilitates a wide variety of logistics and operational systems, from basic dispatching and switch control to positive train control.

The data center 90, in some example implementations, also includes a heater control application 600, as described herein, along with a melter database 200 and an audit log 220. The melter database 200 includes an inventory of melters or heaters 30. The audit log 220 includes a historical record associated with each heater 30 and organized by a timestamp. The heater control application 600 is configured to send a series of requests for weather data, according to a predetermined time interval (e.g., every fifteen minutes). Accordingly, the audit log 220 in some implementations, includes a timestamp, the weather data set associated with said timestamp, and one or more values associated with each heater 30 as described herein.

The heater control application 600, in some implementations, is applied to all the heaters 30 throughout a network which are controlled by or otherwise connected to the data center 90 or any of the systems and processes associated with the data center 90. In other implementations, the heater control application 600 may be applied to a subset of the heaters 30, including one or more the rules and modules described herein. For example, a system administrator, a dispatcher 60, or a person making a visual inspection of one or more waysides, for example, may become aware of a special circumstance (such as a severe or unusual weather event, a maintenance event, a new installation, and the like) and, in response, may select a subset of the heaters 30 to be likely impacted, and adjust the rules, modules, values, and other thresholds associated with this particular subset, for a particular time. In some circumstances, a switch 20 may become stuck, jammed, or otherwise in operable, in any type of weather, including summer. Starting the heater 30 for a brief period, in some cases, may help expand one or more components of the switch 20 and thereby facilitate its return to normal operation. In this aspect, the heater control application 600, in some implementations, is configured to allow an authorized user to override, suspend, or otherwise adjust the rules, modules, values, thresholds, and other variables described herein. In such cases, any adjustment becomes active and effective for the very next weather cycle (e.g., when the next call for weather data is made, within fifteen minutes).

In a related aspect, the heater control application 600, in some implementations, is configured to require the administrator or other authorized user to set a time limit on the adjustment (e.g., two hours, two days, twenty calls for weather data). When such time limit expires, the heater control application 600 will automatically resume its ordinary operation using the prevailing settings. This feature prevents the unintended use of temporary settings beyond the time limit. The time limit itself may have a maximum and/or minimum duration, according to settings in the heater control application 600.

Figure 2:
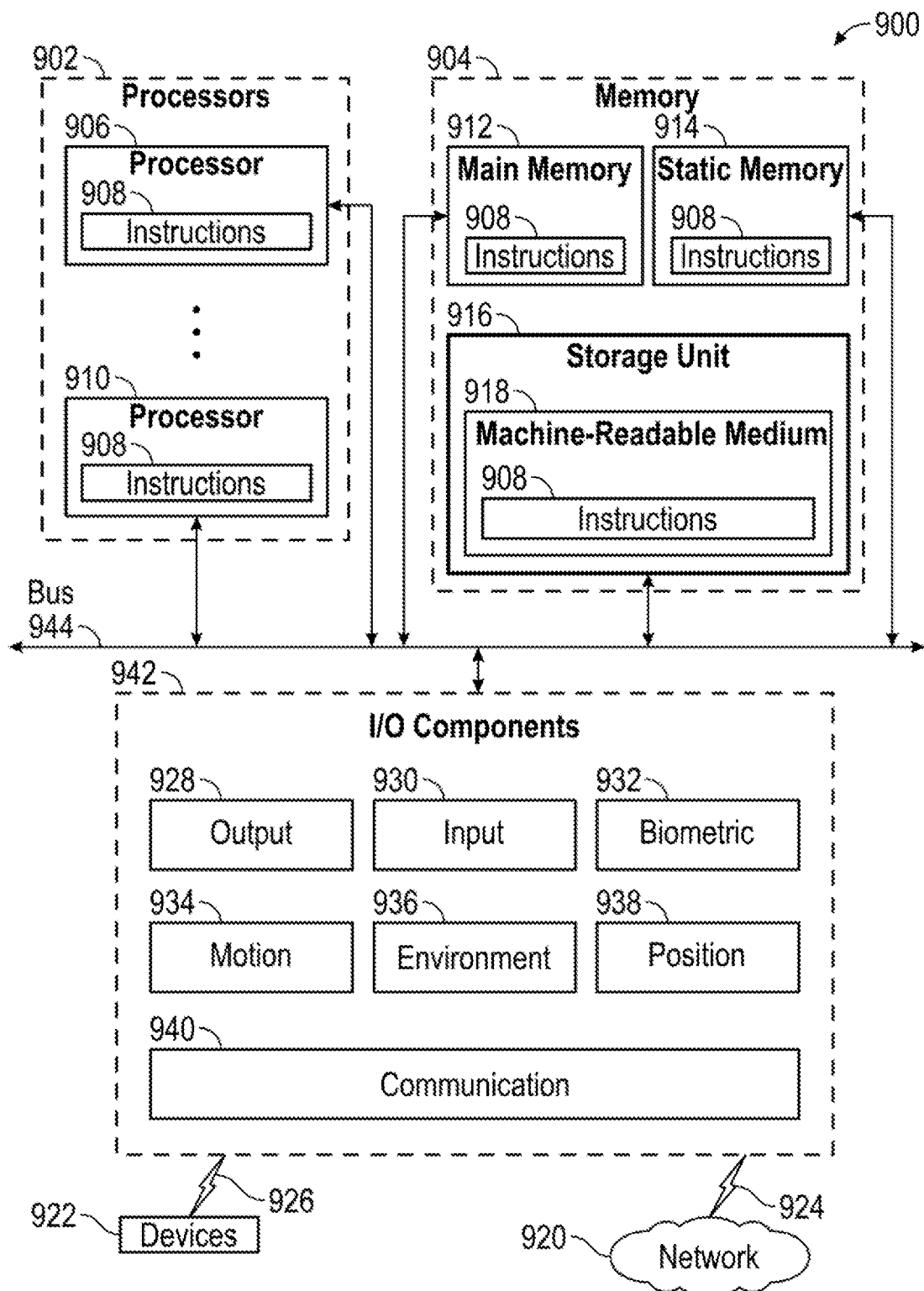
FIG. 2 is a diagrammatic representation of an example hardware configuration for a computing device such as a server.

FIG. 2 is a diagrammatic representation of an example hardware configuration for a computing device such as a server. The machine 900, as shown, includes one or more processors 902, memory elements 904, and input-output components 942, all connected by a bus 944. The instructions 908 (e.g., software, a program, an application, an applet, an app, or other executable code) cause the machine 900 to perform any one or more of the methodologies described herein. For example, the instructions 908 may cause the machine 900 to execute any one or more of the methods and applications described herein. The instructions 908 transform the general, non-programmed machine 900 into a particular machine 900 that is programmed to carry out the described and illustrated functions in the manner described.

The machine 900 may operate as a standalone device or may be coupled (i.e., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and input/output (I/O) components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 5 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 5. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 930 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or to other devices 922. For example, the communication components 940 may include a network interface component 924 or another suitable device to interface with a network 920 (e.g., a wide-area network (WAN) or a public network such as the internet). Another type of interface 926 may be used to interface with other devices 922, which may be another machine or any of a wide variety of peripheral devices (e.g., a peripheral device coupled via a USB). In further examples, the communication components 940 may include wired communication components, wireless communication components, cellular communication components, Near-field Communication (NFC) components, Bluetooth® components (e.g., Bluetooth® Low Energy), WiFi® components, and other components to provide communication via other modalities.

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 3:
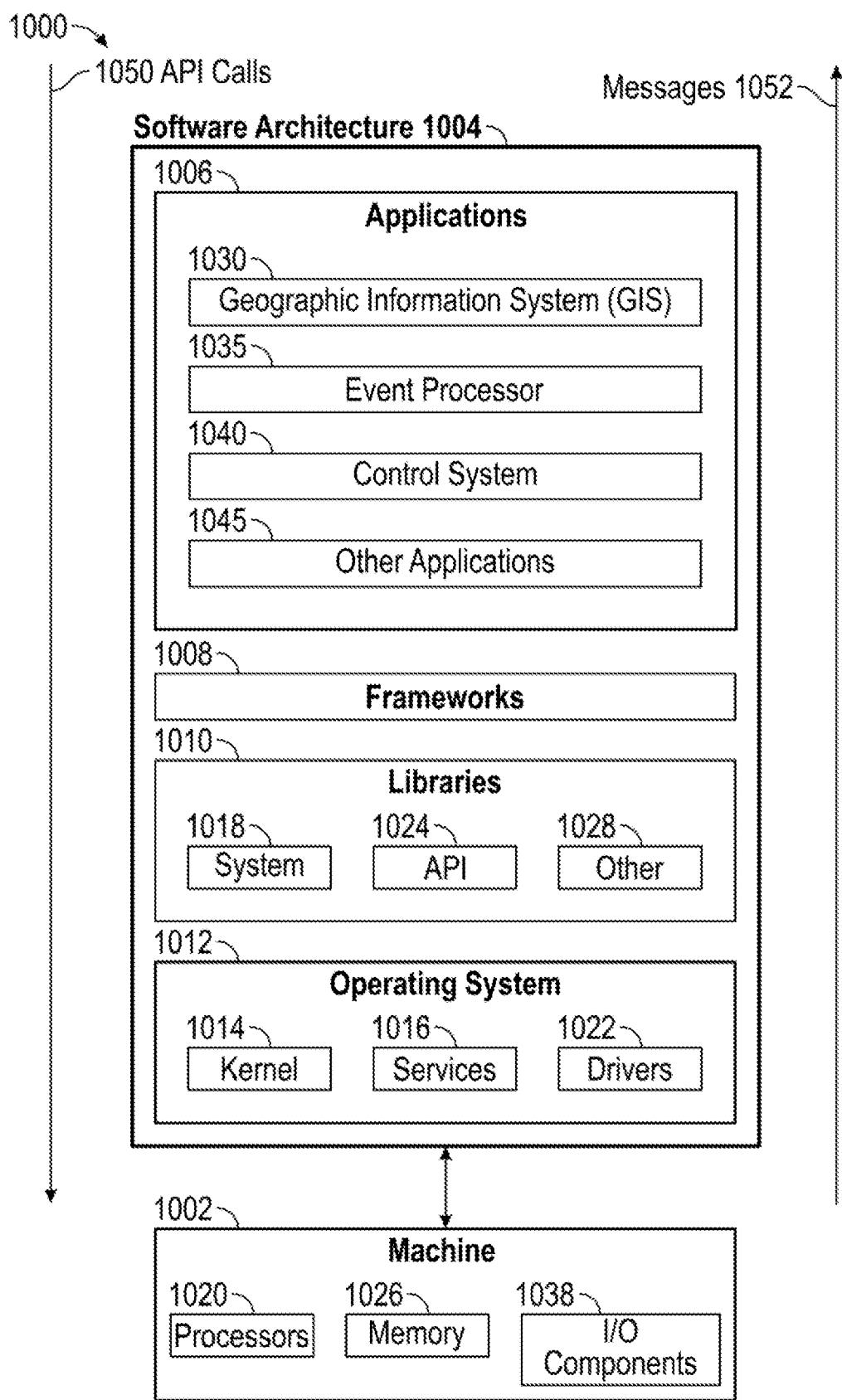
FIG. 3 is block diagram showing a software architecture within which the present disclosure may be implemented, in accordance with examples.

FIG. 3 is block diagram 1000 illustrating an example software architecture 1004. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as applications 1006, frameworks 1008, libraries 1010, and an operating system 1012.

Operationally, the applications 1006 invoke API calls 1050 through the software stack and receive messages 1052 in response to the API calls 1050. An application programming interface (API) in some instances is a software-based intermediary that allows devices or applications to communicate with others. Different APIs can be designed and built for specific purposes. An API Call 1050 is a query or request for information. For example, a mobile device may execute and send an API Call 1050 to a particular application on the mobile device, which processes the query and returns a result (referred to as an API Message 1052). In another example, a server may send an API Call 1050 requesting the configuration attributes associated with a particular application to a remote mobile device, which processes the query and returns a result including the attributes to the server. The term API is also used sometimes to describe discrete functions or features associated with an application.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQL or SQLite to provide various relational database functions), web libraries (e.g., a WebKit® engine to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 include a geographic information system 1030, an event processor 1035, a control system 1040, and other applications 1045. Various programming languages can be employed to create one or more of the applications 1006, structured in a variety of manners, such as object-oriented programming languages (e.g., Objective-C, Java, or C++) or procedural programming languages (e.g., C or assembly language).

Referring again to FIG. 1, the applications stored in or otherwise in communication with the data center 90 include a Geographic Information System (GIS) 400, a Transportation Event Processor (TEP) 500, a Universal Train Control System (UTCS) 700, a Universal Train Message Router (UTMR) 650, and a heater control application 600, as described herein. The databases stored in or otherwise in communication with the data center 90 include a melter database 200 and an audit log 220. The heater control application 600, in some implementations, includes a graphical user interface (GUI) on a display component 928, as described herein, for use by a system administrator, dispatcher 60, or other authorized personnel.

The melter database 200, in some implementations, includes a heater identifier, a wayside 10 identifier, a switch identifier (for the switch(es) served by each particular heater 30), a switch type, a train sensor identifier (for the sensor(s) associated with a particular heater 30), a heater type (e.g., electric or gas), and a heater location (e.g., latitude, longitude, and elevation). The melter database 200 may be integrated with a database management system to create, retrieve, update, query, and otherwise manage the heater data.

The audit log 220, in some example implementations, is a database for maintaining a current and historical record associated with each heater 30. FIG. 5 is an illustration of an example audit log 220 for a heater 30. The heater data associated with all the record entries in this example audit log 220 include the heater location, the nearest weather station location, the heater type, and the switch type (expressed as a value or integer).

The audit log 220 is organized by a system timestamp and, in this example, includes heater data as well as weather data. The heater control application 600 is configured to send a series of requests according to a predetermined time interval which, in this example, is every fifteen minutes. In this aspect, a request for another weather data set is made every fifteen minutes, unless and until the predetermined time interval is changed. The predetermined time interval is a variable that can be adjusted at any time. The predetermined time interval may or may not be the same as the periodic interval at which a weather data application gathers a new set of weather data.

The heater data includes, in the column labeled Status, the command signal that was sent to the heater (e.g., On or no signal). The heater data in this example also includes the number of passing trains counted by the train sensor at the control point 40 associated with the heater 30 since the last record. For example, one train was counted between about 2:25 AM and 2:40 AM.

In additional the command signal sent, the audit log 220 in some implementations includes one or more elements of the local forecast generated by the heater control application 600 as described herein.

The weather data, in this example, includes a snowfall rate (SF), a snow depth code (SDC), a wind speed, and a temperature (TMPF). The weather data, as shown, includes observed conditions (wind speed and temperature) as well as derived values (SF and SDC).

Although the systems and methods are described herein with reference to snow, snowfall, and snow depth, such terms are intended to include any type of precipitation (i.e., any product of the condensation of atmospheric water vapor), including but not limited to rain, freezing rain, sleet (ice pellets), hail, snow pellets (sometimes referred to as soft hail or graupel), snow (in any form), ice crystals, as well as vapor suspensions such as fog and mist, and any combinations thereof (sometimes referred to as mixed precipitation or a wintry mix). The term "snowfall" includes the active falling of any of these types of precipitation, by condensation or other process. Similarly, the term "snow depth" includes the accumulation of any of these types of precipitation.

In some implementations, the observed snowfall rate as reported in a weather data set may be expressed as light (L), medium or moderate (M), and heavy (H). Snow falling at a rate of 0.04 inches or more (but less than 0.09 inches) every fifteen minutes may be classified as a light (L) snowfall rate. Snow falling at between 0.09 inches and 0.16 inches every fifteen minutes may be classified as a moderate (M) snowfall rate. Snow falling at 0.16 inches, or more, every fifteen minutes may be classified as a heavy (H) snowfall rate. These intensity thresholds are variables that may be adjusted at any time, for any particular heater 30 or subset of heaters, or for any other discrete subset.

In some implementations, the observed snow depth as reported in a weather data set may be expressed in terms of a snow depth code (SDC) which is an integer representing a range of depths. SDC equals zero if no accumulated snow is observed. An SDC of 1 is used for an observed snow depth up to one inch. SDC equals 2 for an observed snow depth between one and three inches. SDC equals 3 for depths between three and six inches. SDC equals 4 for depths between six and twelve inches. SDC equals 5 for depths between twelve and eighteen inches. These snow depth ranges are variables that may be adjusted at any time, for any particular heater 30 or subset of heaters, or for any other discrete subset.

A weather data set, in some implementations, includes conditions observed at a weather station location together with data from other sources, such as radar scans, satellite images, and forecast models. For example, a weather data set may include temperature, wind speed, wind chill, precipitation type, precipitation intensity, snow depth, and other data points associated with the prevailing weather conditions. Some data are derived, at least in part. For example, precipitation type (none, rain, sleet, freezing rain, snow, etc., and mixtures thereof) may be observed and/or derived from a radar scan. Precipitation intensity may also be derived from a radar scan. Accumulated snow depth may be estimated, based on the current snowfall rate, solar conditions, winds, and temperature. The wind chill, or wind chill equivalent temperature, may be based on temperature and wind speed; some models include pressure or relative humidity.

Weather data applications 300 may be configured to gather weather data at periodic intervals (e.g., every fifteen minutes, every hour) in order to create and maintain a current record of the prevailing conditions.

Figure 4:
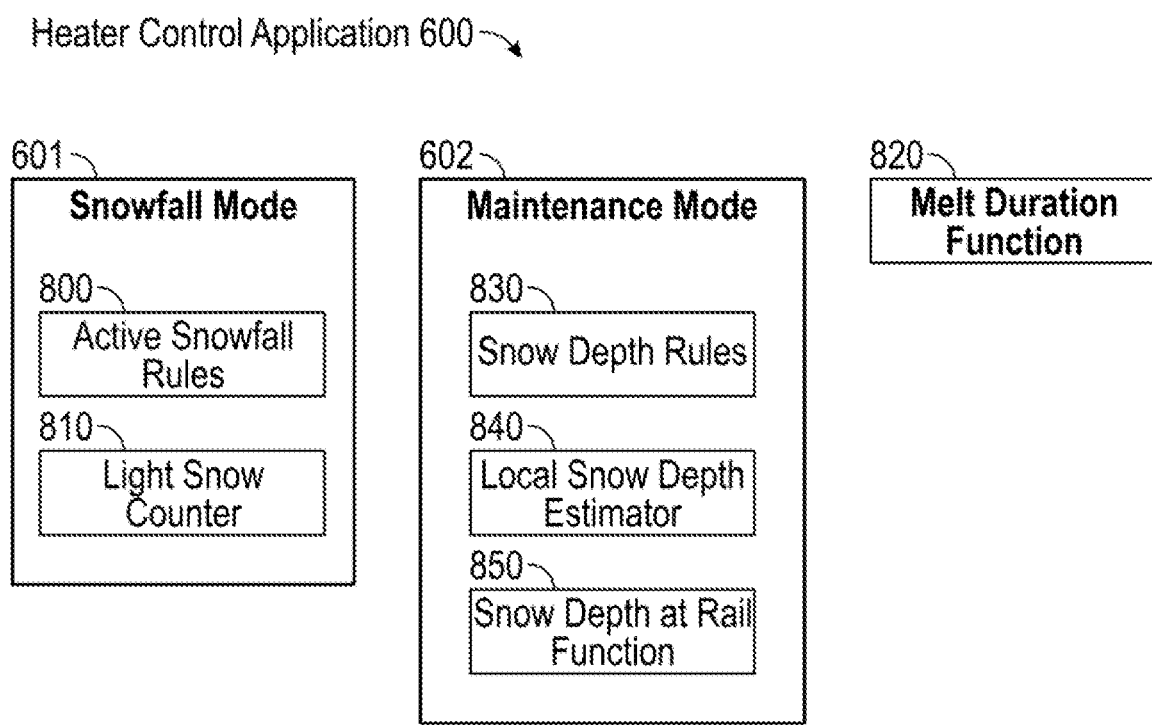
FIG. 4 is a block diagram showing the modes, modules, and functions of a heater control application, in accordance with some example implementations.

FIG. 4 is a block diagram showing the modes, modules, and functions of an example heater control application 600, in accordance with some implementations. The example heater control application 600, in this example, includes a snowfall mode 601 and a maintenance mode 602, both of which may access and otherwise use a melt duration function 820. In one aspect, the modes 601, 602 are part of a weather modeling function that is used to generate a local forecast for each heater 30 in the network.

The heater control application 600, in some implementations, operates as a system 100 for controlling a network of remote equipment, such as switch heaters. In this aspect, the heater control application 600 in its operation as a system 100 includes the weather data application 30, the server or data center 90 or other computing devices acting as a server with a processor and a memory, and the network of dispatchers 60 and waysides 10. The heater control application 600 is stored in memory and executed by the processor to perform the methods and processes described herein. The snowfall mode 601, maintenance mode 602, and melt duration function 820 operate as system elements within the heater control application 600 and are configured to cooperate and otherwise communicate with other elements of the system 100, including the weather data application 30, the data center 90, and the network of dispatchers 60 and waysides 10 as described herein.

The method of using the heater control application 600 to control a network of remote equipment, such as switch heaters, in some implementations, may be understood by considering how the process operates for a single heater. A first heater, for example, is associated with a first heater location. The method includes sending a request to a weather data application to obtain a plurality of weather data sets, each from a different weather station. Each weather data set may include a weather station location and one or more observed conditions, such as wind speed and temperature.

Heater locations may be stored in the melter database 200 as described herein. For example, a heater location may include its latitude, longitude, and/or elevation. Weather station locations may also include latitude, longitude, and/or elevation.

The method in some examples includes identifying the weather station located closest to the heater location, using latitude and longitude. The method may include establishing a first threshold distance associated with the heater, such as a radius or polygon mathematically situated near the heater location. A weather station within the first threshold distance would be identified as a first weather station to be associated with the first heater. The threshold distance, in some implementations, uses the latitude and longitude of the heater locations and the weather station locations, to an accuracy of two decimal places. In some cases, in which two or more weather stations are located within the first threshold distance, the method may select the closest station to be the first weather station. The data associated with the selected first weather station is called the first weather data set.

The method further includes generating and transmitting a first command signal to the first heater. The first command signal is based on the first weather data set. After the weather modeling function generates a first local forecast (derived from the first weather data set), the first command signal is then based on the first local forecast.

The step of sending a request to a weather data application, in some implementations, includes constructing an API call that is tailored to the weather data application such that the request seeks and obtains the weather data in a useful format for the heater control application 600.

The step of sending a request, in some implementations, is repeated according to a predetermined time interval. In this aspect, the method generates a current picture of the prevailing weather conditions and a historical record of the conditions. Each weather data set is stored in an audit log 220, as described herein, and arranged according to a timestamp. Although the method is described in terms of a first heater, a first plurality of weather data sets, and so forth, the heater control application 600 is configured to send a subsequent request for a subsequent second heater, and so on, until weather data is gathered and applied to all the heaters in the network.

The heater control application 600, as shown in FIG. 1, in some implementations, is stored on a device, such as data center 90, which is in communication with a plurality of switch heaters in a vast network. The heater control application 600 includes a weather modeling function that includes a snowfall mode 601 and a maintenance mode 602. The weather modeling function generates a local forecast associated with each heater 30. The melt duration function 820 determines how long to operate each heater 30, according to its local forecast, and returns a value in minutes. In this aspect, the first command signal may be generated based on a first local forecast associated with the first heater, instead of being generated based solely on the first weather data set.

The heater control application 600, in some implementations, first evaluates whether to operate in snowfall mode 601 or in maintenance mode 602. Snowfall mode 601 applies for active snowfall conditions and, in most cases, generates a start signal commanding the heater 30 to be on. When snow is not actively falling, maintenance mode 602 applies and operates based on snow depth, temperature, wind speed, and in some implementations, the blowing of snow caused by passing trains.

Each weather data set includes, in some implementations, at least a snowfall rate, a snow depth, a wind speed, and a temperature. The weather data application, in some implementations, generates one or more derived values based on the observed conditions. For example, a snowfall rate (SF) (e.g., light, moderate, or heavy) may be derived from the observed snowfall rate (measured in inches per hour, for example), as described above. Similarly, a snow depth code (SDC) as described above may be derived from the observed snow depth. In another aspect, the heater control application 600, in some implementations, generates these or other derived values based on the observed conditions in each weather data set.

Although the one or more flowcharts may depict the operations as a sequential process, many of the operations can be performed in parallel or concurrently. In addition, the order of the operations may be rearranged. A process is terminated when its operations are completed. The term process may correspond to method, procedure, and the like. The steps of a process or method may be performed in whole or in part, may be performed in conjunction with some or all of the steps in the same or other methods, and may be performed by or in conjunction with any of a variety of different systems, such as the systems described herein.

Figure 6:
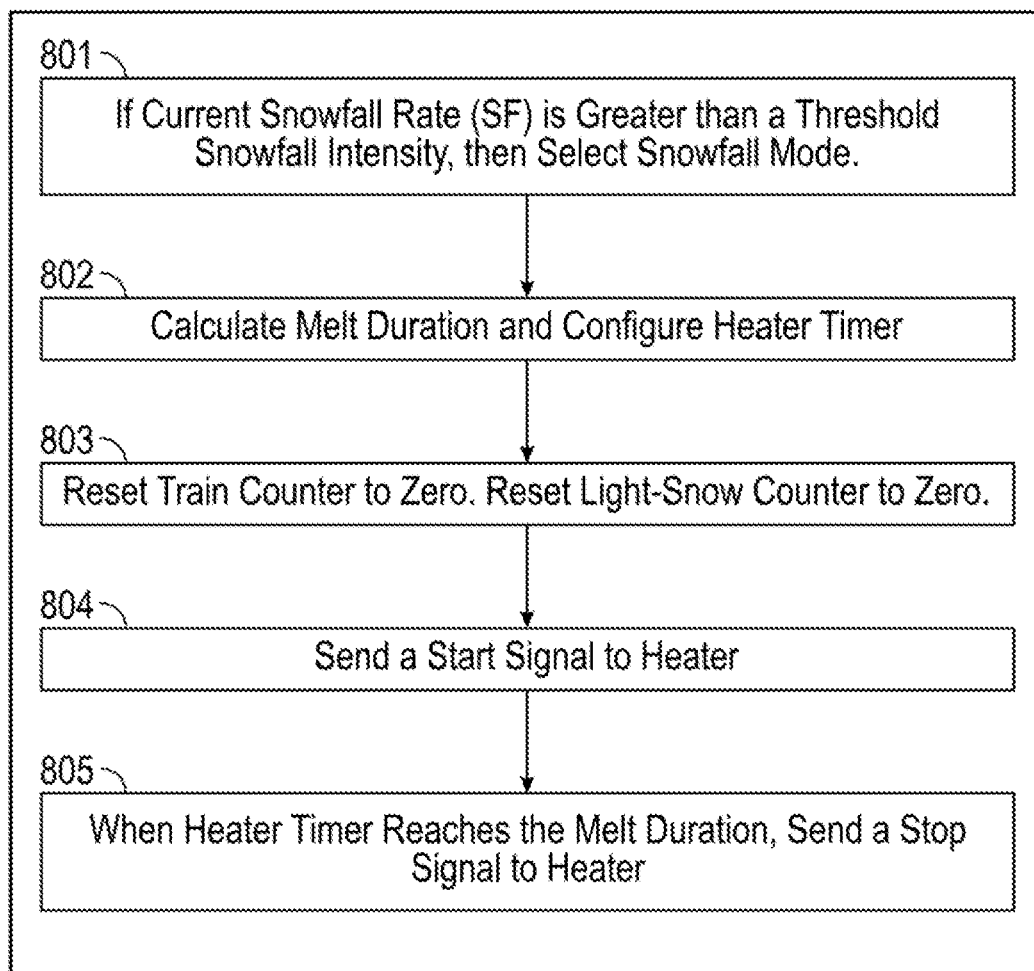
FIG. 6 is a series of steps in applying active snowfall rules, in accordance with some example implementations.

FIG. 6 shows is a series of steps in applying active snowfall rules 800, in some implementations, to decide whether the heater control application 600 should operate in snowfall mode 601. The weather modeling function of the heater control application 600 may first determine, at operation 801, whether the snowfall rate is greater than a threshold snowfall intensity. In some implementations, the threshold snowfall intensity may be set at 0.09 inches per fifteen-minute time period, which represents moderate (M) snowfall according to some models. As described above, the observed snowfall rate may be classified as light (L) for snow falling at a rate of 0.04 inches or more (but less than 0.09 inches) every fifteen minutes. Snow falling at between 0.09 inches and 0.16 inches every fifteen minutes may be classified as moderate (M). Snow falling at 0.16 inches, or more, every fifteen minutes may be classified as heavy (H). These intensity thresholds are variables that may be adjusted at any time, for any particular heater 30 or subset of heaters, or for any other sub set.

As described herein, the term "snowfall" refers to and includes any type of precipitation. Accordingly, the snowfall rate and snowfall rules will apply when conditions, for example, are producing freezing rain, sleet, or a wintry mix.

If the snowfall rate is greater than the threshold snowfall intensity, then the heater control application 600 (operating in snowfall mode), at operation 802, calculates a melt duration (as calculated in operation 802 according to the melt duration function described herein) and configures a heater timer. The heater control application 600 generates a first command signal that includes a start signal for the first heater. In circumstances when a start signal is sent, the train counter value is reset to zero and the light-snow counter is reset to zero, at operation 803. The start signal, at operation 804, is sent to the heater.

Under the active snowfall rules 800, when snow is falling at rate above a threshold limit, the heater control application 600 starts the heater and it runs for a melt duration time—as long as no subsequent forecast generates a new start signal, in which case the counter values reset to zero and the heater timer starts again. If and when the heater timer reaches the melt duration limit, the heater control application 600 at operation 805 generates a command signal that includes a stop signal for stopping the heater.

The heater timer starts again at zero (i.e., is reset to zero) every time the heater control application 600 generates and sends a start signal to the first heater. In this aspect, the heater timer is reset to zero and the melt duration is reset, thus extending the melting period. For example, if the heater control application 600 sends a start signal to the heater at 10:00 AM, the heater timer starts at zero and the melt duration is forty-five minutes (in this example); the heater timer will expire at 10:45 AM. At the next weather report, if the heater control application 600 again sends a start signal to the heater at 10:15 AM, then the heater time is reset to zero, and the melt duration of forty-five minutes starts again and will now expire at 11:00 AM. If the heater control application 600 does not send another start signal to the heater before 11:00 AM, the melt duration will continue to elapse and will expire and the heater control application 600 will send a stop signal to the heater at 11:00 AM.

Figure 7:
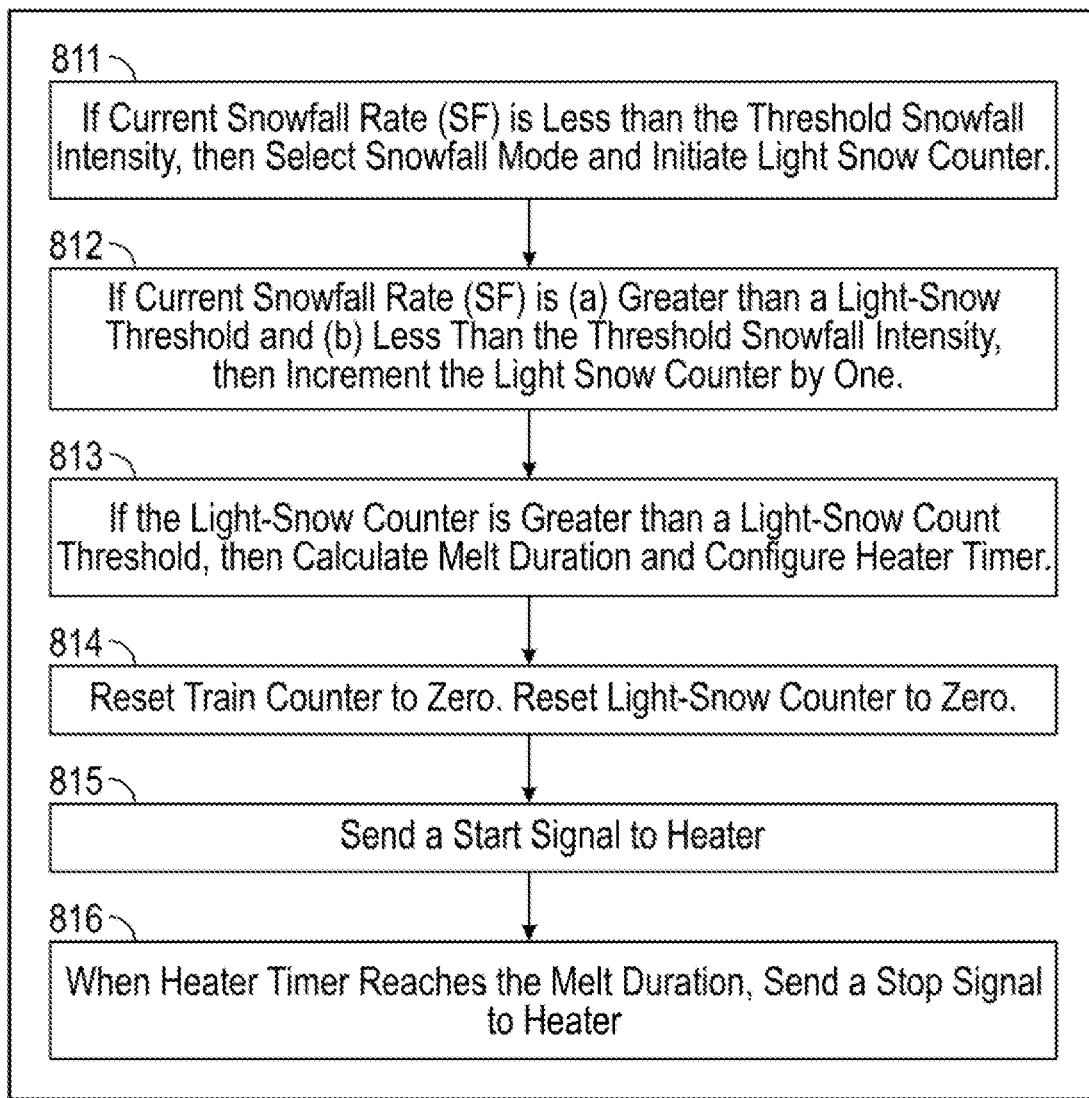
FIG. 7 is a series of steps in applying a light snow counter, in accordance with some example implementations.

FIG. 7 is a series of steps in applying a light snow counter 810, in accordance with some example implementations. The light snow counter 810 of the heater control application 600, in some implementations, operates when the active snowfall rules 800 are not active. In other words, when the observed snowfall rate is less than the threshold snowfall intensity, the heater control application 600 at operation 811 selects snowfall mode 601 and initiates a light snow counter 811.

The light snow counter 810, in some implementations, relies upon a light-snow counter value obtained every time a new weather data set is obtained. The light-snow counter resets to zero every time the heater control application 600 sends a start signal to a heater. If no start signal is indicated, then the light-snow counter value increments by one, at operation 812 (at every predetermined time interval in which no start signal is indicated). In some circumstances, the light-snow counter value may continue to increment for more than twenty-four hours, or longer, until it reaches the light-snow count threshold (as long as the snowfall intensity during that period does not increase and trigger a start signal based on medium or heavy snowfall, in which case the light-snow counter will reset to zero.

The light snow counter 810, in some implementations, evaluates historical data stored in the audit log 220 to determine, generally, how long light snow has been falling near the first heater. Light snow, as described above, may be defined as snow falling at a rate of 0.04 inches or more every fifteen minutes (greater than a light-snow threshold), but less than 0.09 inches every fifteen minutes (less than the threshold snowfall intensity). Light snow, if observed, is recorded in the audit log 220 in association with a timestamp for the observation. The time window corresponds to a number of weather data sets. For example, a time window of six hours, using a predetermined time interval of fifteen minutes (four per hour), corresponds to twenty-four weather data sets. In this example, at operation 812, the heater control application 600 counts the quantity of occurrences of light snow found anywhere among the immediately previous twenty-four weather data sets. The occurrences need not be consecutive; in other words, light snow need not be observed on a continuous basis in order to be included in the light snow counter 810.

The heater control application 600, at operation 813, compares the quantity of occurrences of light snow counted (or, in some implementations, the light-snow counter value) to a light-snow count threshold which, in some implementations, may be set to twelve. If the light-snow counter value is greater than the light-snow count threshold, then the heater control application 600 at operation 813 calculates the melt duration and configures the heater timer. In circumstances when a start signal is sent, the train counter value is reset to zero and the light-snow counter is reset to zero, at operation 814. The start signal, at operation 815, is sent to the heater. If and when the heater timer reaches the melt duration limit, the heater control application 600 at operation 816 generates a command signal that includes a stop signal for stopping the heater.

Using the light snow counter 810, when light snow is observed during a minimum number of time windows, the heater control application 600 starts the heater and it runs for a melt duration time. When the heater timer reaches the melt duration limit, the heater control application 600 at operation 816 generates a command signal that includes a stop signal for stopping the heater.

Light snow (or other light winter precipitation) is often prevalent along the edge of a winter storm. For example, over the course of six hours (twenty-four weather reports) the light snow counter 810 may record twelve or more occurrences of light snow. When the twelfth occurrence is counted, the heater control application 600 sends a start signal to the heater at 1:35 PM, the heater timer starts at zero and the melt duration is seventy-five minutes (in this example); the heater timer will expire at 2:05 PM. At the next weather report at 1:40 PM, the light snow counter 810 counts the occurrences of light snow in the preceding twenty-four weather reports. In this aspect, the preceding time window is a moving time window. If twelve occurrences are counted again, if the heater control application 600 again sends a start signal to the heater at 1:40 PM, the heater time is reset to zero, and the melt duration of seventy-five minutes starts again and will now expire at 2:20 PM. If the heater control application 600 does not send another start signal to the heater before 2:20 PM, the melt duration will continue to elapse and will expire and the heater control application 600 will send a stop signal to the heater at 2:20 PM.

Figure 8:
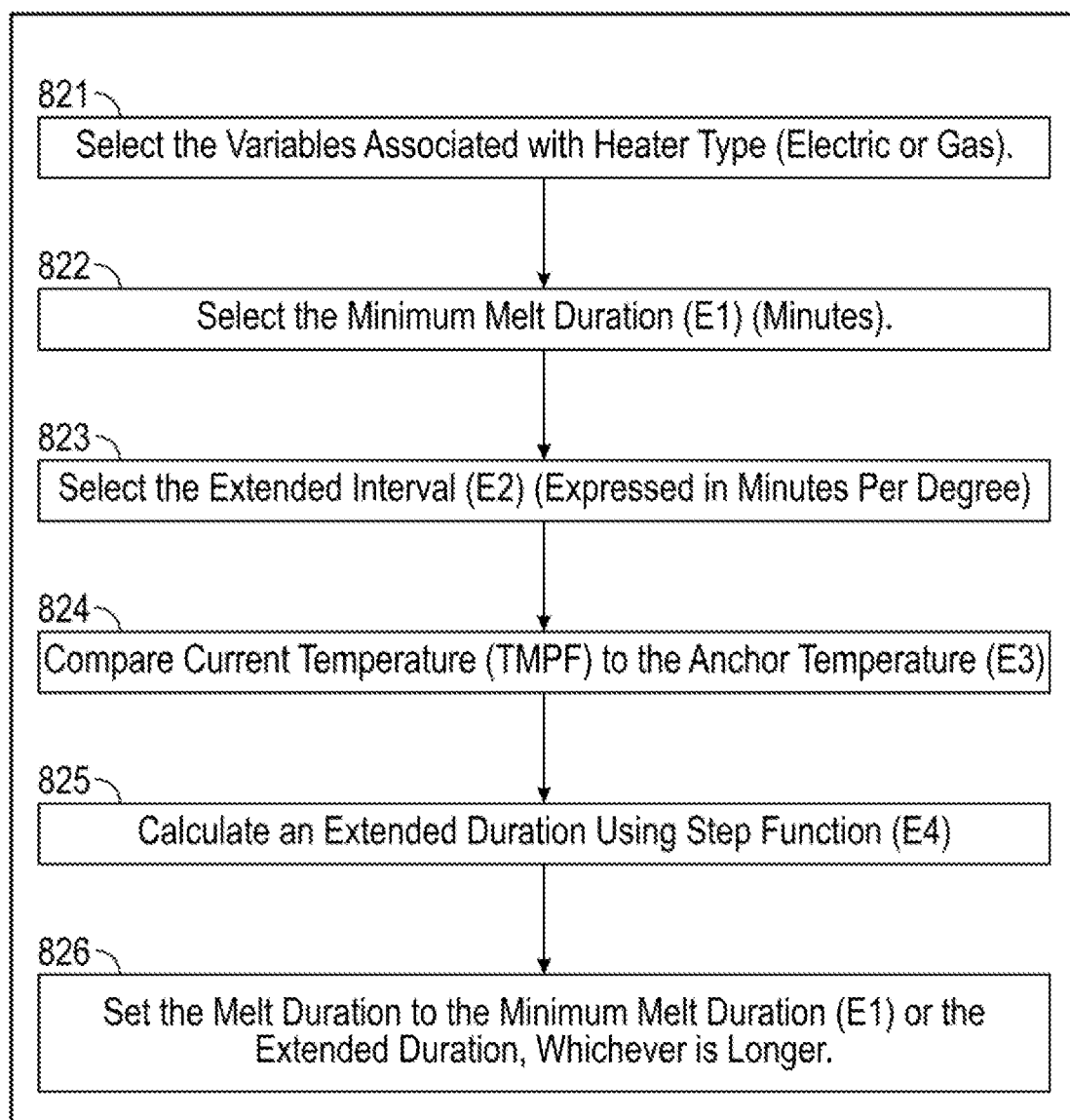
FIG. 8 is a series of steps in applying a melt duration function, in accordance with some example implementations.

FIG. 8 is a series of steps in applying a melt duration function 820, in accordance with some example implementations. The melt duration function 820 calculates a melt duration, in minutes, according to temperature and a number of variables associated with the heater type.

Each heater type has a minimum melt duration (1), an extended interval (2) which is expressed as minutes per degree, an anchor temperature (3), and a step function (4). In general, the melt duration function 820 ensures that each heater, in response to a start signal, remains on for at least a minimum duration and stays on for an additional time in very cold weather.

For a heater type that is electric, according to one example, the minimum melt duration (E1) is seventy-six minutes, the extended interval (E2) is four minutes per degree, the anchor temperature (E3) is forty-eight degrees, and the step function uses a value (E4) equal to fifteen.

For a heater type that is gas (using P to indicate propane), according to one example, the minimum melt duration (P1) is forty-six minutes, the extended interval (P2) is five minutes per degree, the anchor temperature (P3) is forty-four degrees, and the step function uses a value (P4) equal to fifteen.

The melt duration function 820 at operation 821 selects the variables associated with the particular heater type.

Using the electric heater variables in this example, the melt duration (MD), in some implementations, is a function of the temperature (TMPF), a minimum melt duration (E1), an extended interval (E2), an anchor temperature (E3), and a step function (E4), according to the equation:

$$MD=MAX\ (E1,\ 1+E4\times INT\ ((E3-TMPF)/E2)).$$

The operator MAX selects the maximum value from among the values listed inside the parentheses. The heater control application 600 at operation 822 selects the value of E1, which is the minimum melt duration (E1) of seventy-six minutes for an electric heater. The operator MAX will select either the minimum melt duration (E1) or the second value, if it is greater. The melt duration, therefore, will be at least equal to the minimum melt duration (E1). The value for E2 is selected at operation 823. The value for E3 is selected at operation 824.

The second quantity in parentheses, referred to as an Extended Duration, is calculated at operation 825 and expressed as:

$$1+E4\times INT\ ((E3-TMPF)/E2)$$

The operator INT is a function that rounds a quantity to the nearest integer value. The quantity in this expression equals the quantity (E3 minutes the current temperature (TMPF)) divided by E2. For a temperature of eight degrees, the quantity equals ten. The resulting integer (ten, in this example) is multiplied times E4 and the result is added to one. The result is an Extended Duration equal to one hundred fifty-one minutes (which is greater than the E1 minimum of seventy-six minutes).

At operation 826, the operator MAX selects the maximum from among the values in parentheses; either the minimum melt duration (E1) or the Extended Duration, whichever is longer, and sets the melt duration (MD) for use with this heater type, at this temperature.

Figure 9:
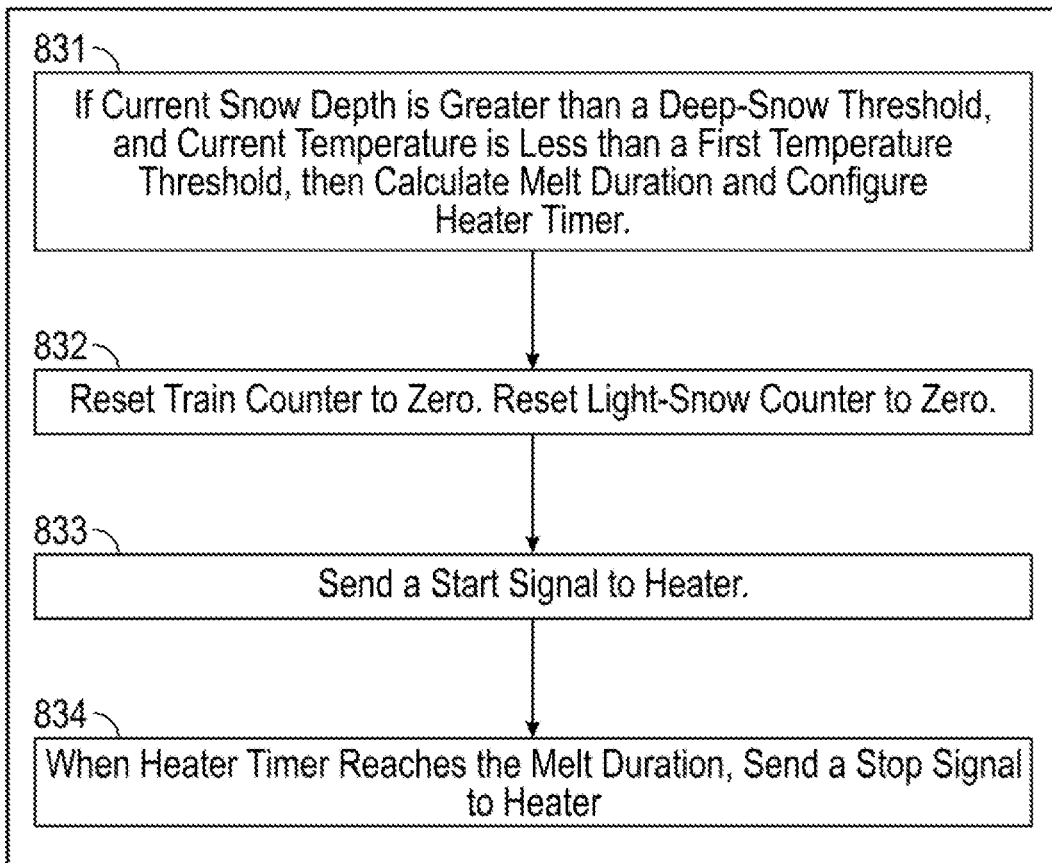
FIG. 9 is a series of steps in applying snow depth rules, in accordance with some example implementations.

FIG. 9 shows a series of steps in applying snow depth rules 830, in some implementations, to decide whether the heater control application 600 should operate in maintenance mode 602. In general, the maintenance mode 602 applies in the absence of active snowfall and in response to a snow depth and conditions (i.e, a low temperature) that are sufficiently severe to require melting. Snow depth varies according to a number of external forces, including wind and passing trains. The energy from passing trains has the capacity to move snow, both into and out of switches. Wind energy, under certain conditions, will move snow and change the snow depth. Snow melting at temperatures above freezing are seldom moved by wind. When snow re-freezes at low temperatures, with or without wind, the maintenance mode 602 includes rules to re-activate melting.

The snow depth rules 830, in some implementations, together with the local snow depth estimator 840, the snow depth at rail function 850, and the alternative snow depth matrix 860 are designed to facilitate lower energy costs by turning heaters off when the snow melts at temperatures above freezing and/or when the snow is cleared by wind or passing trains at any temperature.

The weather modeling function of the heater control application 600 may determine, at operation 831, whether (a) the snow depth is greater than a deep-snow threshold and (b) the temperature is less than a first temperature threshold. In some implementations, the deep-snow threshold is six inches and the first temperature threshold is thirty-four degrees. When such conditions are met, then the heater control application 600 (operating in maintenance mode), at operation 831, calculates a melt duration (as calculated in operation 831 according to the melt duration function described herein) and configures a heater timer. In any circumstance when a start signal is sent, the train counter value is reset to zero and the light-snow counter is reset to zero, at operation 832. The start signal, at operation 833, is sent to the heater. If and when the heater timer reaches the melt duration limit, the heater control application 600 at operation 834 generates a command signal that includes a stop signal for stopping the heater.

Figure 7A:
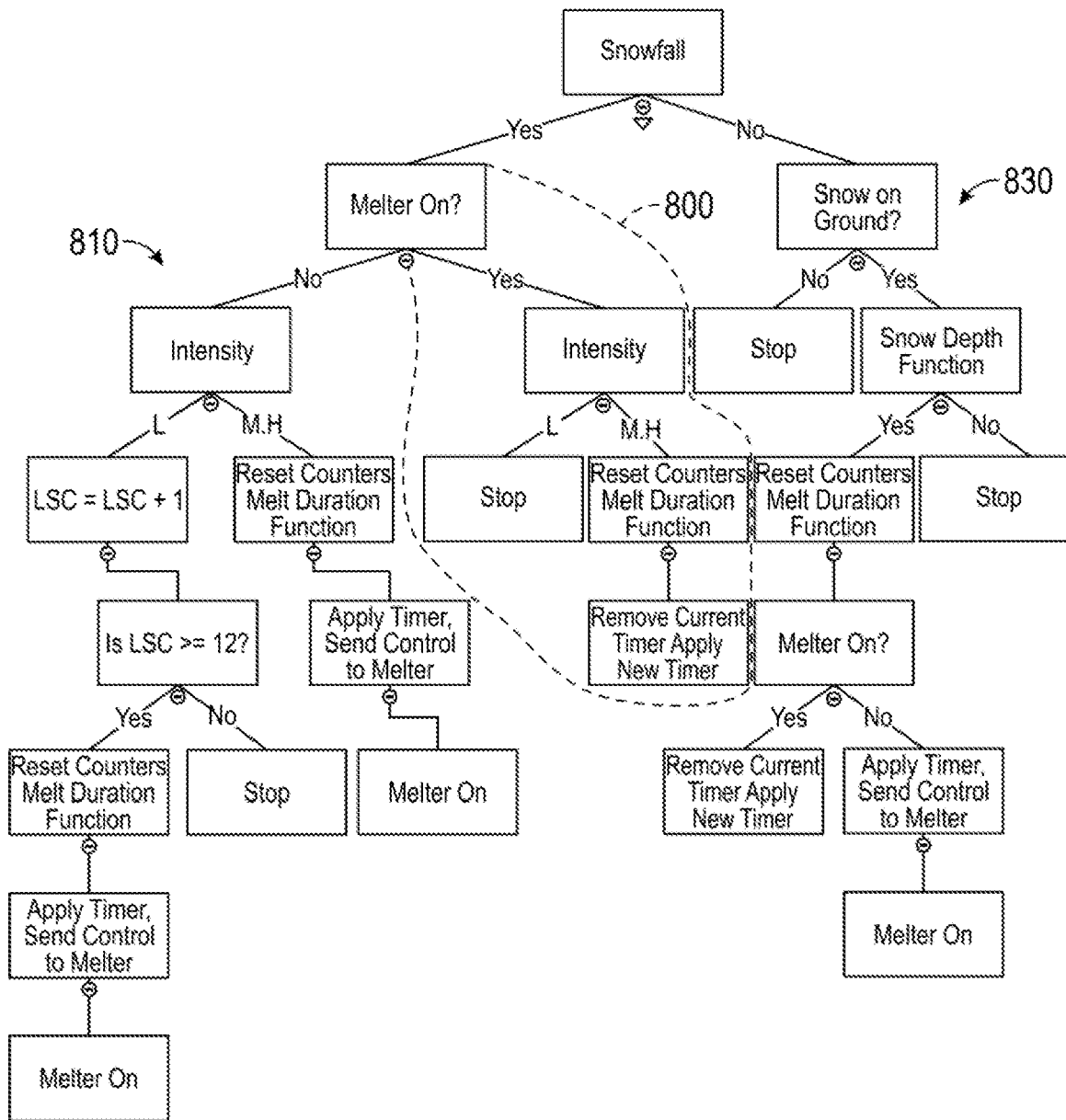
FIG. 7A is an example decision tree showing a series of steps related to the active snowfall rules, the light snow counter, and the snow depth rules, in accordance with some example implementations.

FIG. 7A is an example decision tree showing a series of steps related to the active snowfall rules 800 of FIG. 6, the light snow counter 810 of FIG. 7, and the snow depth rules 830 of FIG. 9, in accordance with some example implementations. The light snow counter value, in some implementations, increments by one at each weather check when the intensity condition is met, and is only reset to zero if (1) the current temperature exceeds a threshold (such as thirty-three degrees) or (2) some other condition results in a start signal being sent to the heater.

Figure 10:
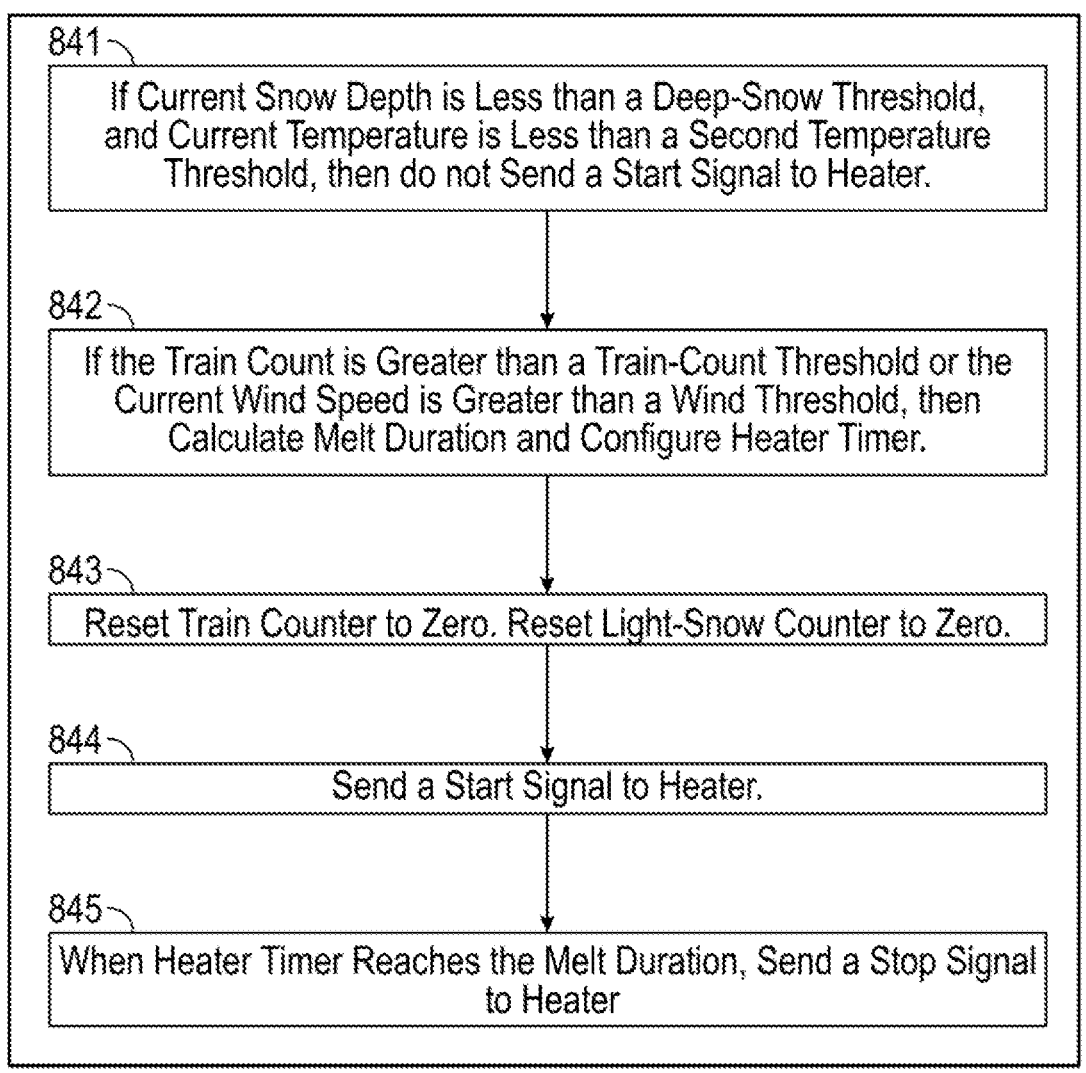
FIG. 10 is a series of steps in applying a local snow depth estimator, in accordance with some example implementations.

FIG. 10 shows a series of steps in applying a local snow depth estimator 840, in accordance with some example implementations. In this aspect, the heater control application 600 includes a weather modeling function that evaluates the impact of wind and train traffic conditions to establish a local forecast snow depth associated with each heater.

The weather modeling function of the heater control application 600 may determine, at operation 841, whether (a) the snow depth is less than the deep-snow threshold and (b) the temperature is less than a second temperature threshold. In some implementations, the deep-snow threshold is six inches and the second temperature threshold is thirty-three degrees. When such conditions are met, the heater control application 600 does not send a start signal to the heater, and instead proceeds to an evaluation of the train count and wind conditions, at operation 842.

At operation 842, weather modeling function of the heater control application 600, in some implementations, counts the number of trains that passed the first heater during a predetermined time period, as recorded in the audit log 220. As described herein, the heater control application 600, in some implementations, obtains a plurality of passing-train data sets associated with each heater 30 in the network and stores each data set in the audit log 220. The passing-train data set includes a passage start time; the time at which a train arrives and starts to pass the wayside 10. The heater control application 600, at operation 842, determines (a) whether the number of trains is greater than a train-count threshold, and (b) whether the wind speed is greater than a wind threshold. If either is true; that is, if (a) the number of trains is greater than a train-count threshold OR (b) the wind speed is greater than a wind threshold, then the heater control application 600 (operating in maintenance mode), at operation 842, calculates a melt duration and configures a heater timer. In any circumstance when a start signal is sent, the train counter value is reset to zero and the light-snow counter is reset to zero, at operation 843. The start signal, at operation 844, is sent to the heater. If and when the heater timer reaches the melt duration limit, the heater control application 600 at operation 845 generates a command signal that includes a stop signal for stopping the heater.

Using the local snow depth estimator 840, if a particular combination of trains and wind is present, then the heater control application 600 generates a first command signal that includes a start signal for the first heater and configures a heater timer to start at zero and run for a melt duration (as calculated in operation 842). When the heater timer reaches the melt duration limit, the heater control application 600 at operation 845 generates a command signal that includes a stop signal for stopping the heater.

Figure 10A:
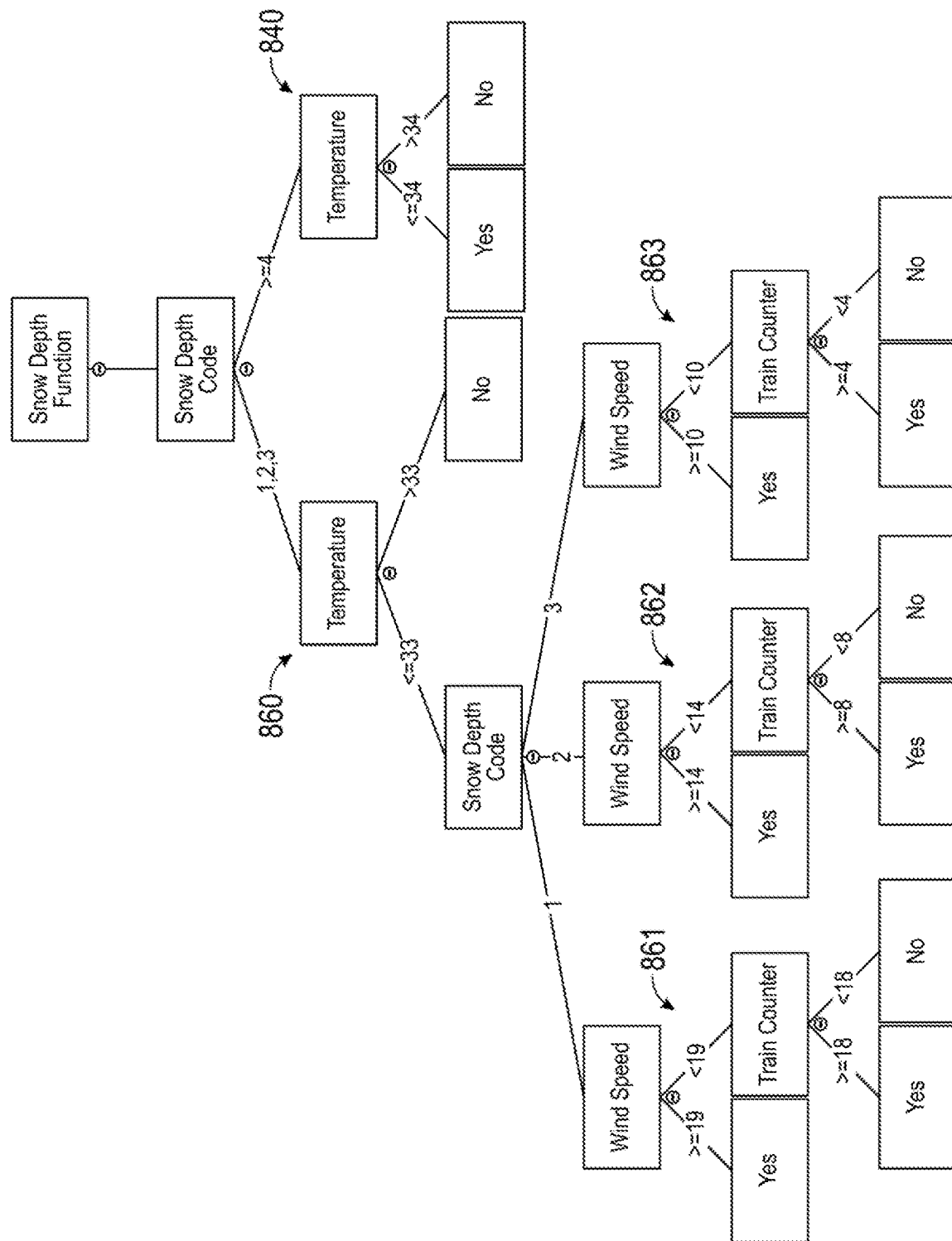
FIG. 10A is an example decision tree showing a series of steps related to the local snow depth estimator and an alternative snow depth matrix, in accordance with some example implementations.

FIG. 10A is an example decision tree showing a series of steps related to the local snow depth estimator 840 and to an alternative snow depth matrix 860, in accordance with some example implementations. The alternative snow depth matrix 860, in some implementations, filters the weather data according to temperature, then snow depth, then wind speed, and then train count. In this implementation, these variables work together as part of the weather modeling function of the heater control application 600 in order to decide whether the local snow depth as modeled is sufficient to send a start signal to the heater.

For example, in a first subset of rules 861, as shown in FIG. 10A: if the snow depth is greater than zero and less than one inch and the wind speed is greater than nineteen miles per hour, the heater control application 600 sends a start signal to the heater. If the wind speed is less than nineteen miles per hour, and the train counter is greater than eighteen, the heater control application 600 sends a start signal to the heater; otherwise no signal is sent.

For example, in a second subset of rules 862: if the snow depth is between one and three inches and the wind speed is greater than fourteen miles per hour, the heater control application 600 sends a start signal to the heater. If the wind speed is less than fourteen miles per hour, and the train counter is greater than eight, the heater control application 600 sends a start signal to the heater; otherwise no signal is sent.

For example, in a third subset of rules 863: if the snow depth is between three and six inches and the wind speed is greater than ten miles per hour, the heater control application 600 sends a start signal to the heater. If the wind speed is less than ten miles per hour, and the train counter is greater than four, the heater control application 600 sends a start signal to the heater; otherwise no signal is sent.

In this aspect, the train counter may not have an impact on the snow depth estimation except in circumstances when the snow depth and wind thresholds are satisfied.

Figure 11:
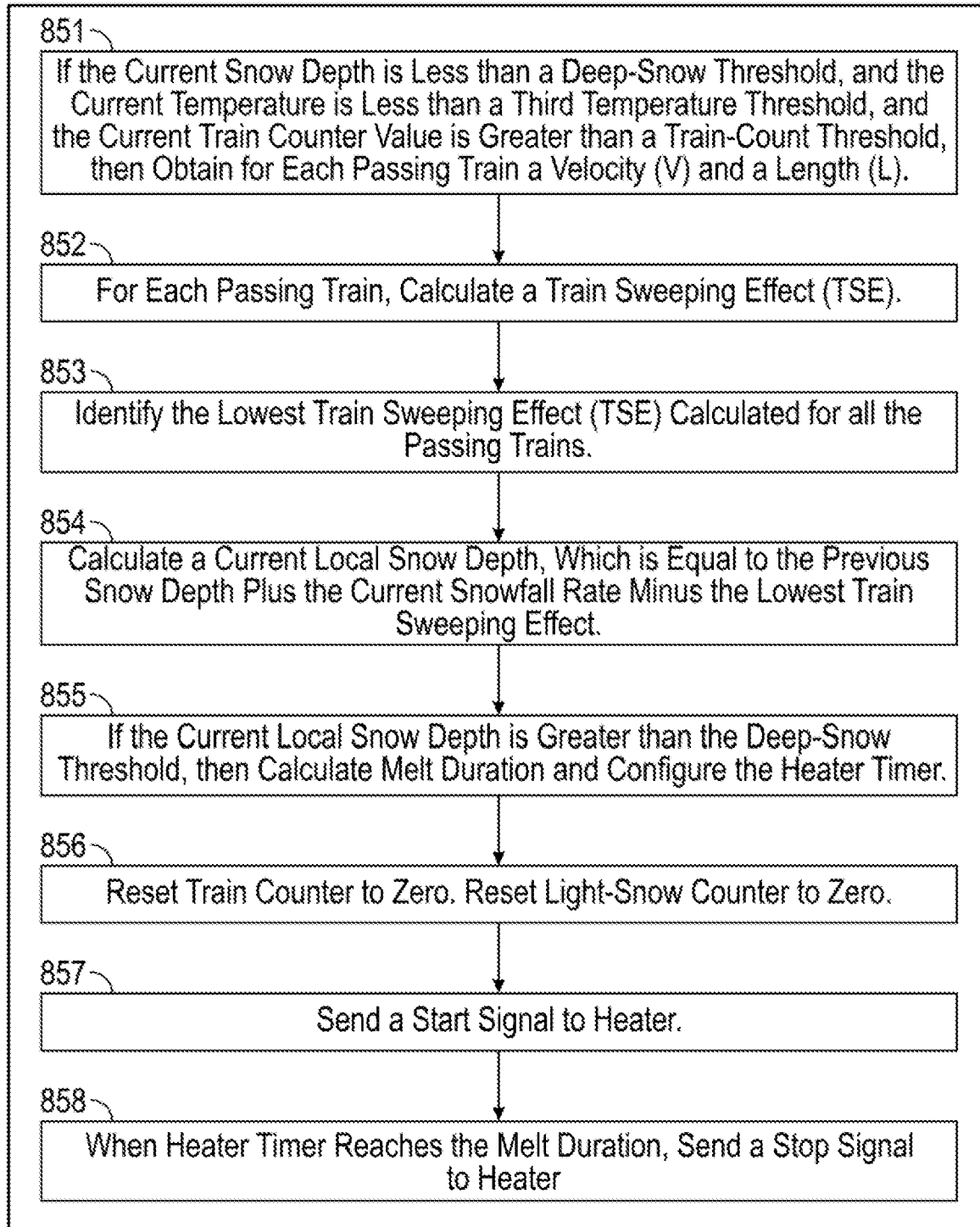
FIG. 11 is a series of steps in applying a snow depth at rail function, in accordance with some example implementations.

FIG. 11 shows is a series of steps in applying a snow depth at rail function 850, in accordance with some example implementations. In this aspect, the weather modeling function of the heater control application 600 evaluates the impact of passing trains, including velocity and length, to establish a local forecast snow depth associated with each heater. The snow depth at rail function 850 may be performed instead of or in addition to the local snow depth estimator 840 shown in FIG. 10.

The weather modeling function of the heater control application 600 may determine, at operation 851, whether (a) the snow depth is less than the deep-snow threshold and (b) the temperature is less than a third temperature threshold. In some implementations, the deep-snow threshold is six inches and the third temperature threshold is thirty-four degrees. When such conditions are met, the heater control application 600 uses the weather modeling function to estimate the local snow depth near the heater 30, known as the snow-depth-at-rail (SDR).

The weather modeling function of the heater control application 600, in some implementations, obtains a plurality of passing-train data sets associated with each train that passed the first heater during a recent-passage time window. The passing-train data sets include a passage start time, a train velocity (V), and a train length (L). The passing-train data sets are recorded in the audit log 220. The Universal Train Control System (UTCS) 700 in some implementations is gathering not only the presence or absence of a train passing each train sensor at the control point 40, but also capturing the velocity (V) and length (L).

At operation 852, weather modeling function of the heater control application 600, in some implementations, identifies a select subset of the passing-train data sets having a passage start time that falls within the recent-passage time window. The select subset of the passing-train data sets, in some implementations, is limited to those data sets in the audit log 220 since the most recent stop signal was sent to the heater. The recent-passage time window, in some implementations, is equal to one preceding time interval (i.e., the immediately previous fifteen minutes). The heater control application 600 at operation 852 further calculates a train sweeping effect (TSE) associated with each train in the select subset. The train sweeping effect (TSE), in some implementations, is a function of the train velocity (V), the train length (L), a constant (C), and a switch-type value (N) associated with said first heater, according to the equation:

$$TSE=(V \times L)/(N \times C).$$

The switch-type value (N), in some implementations, is equal to one for a single-track switch, two for a crossover or double-track switch, and three for a multi-track switch. The constant (C), in some implementations, is equal to 2,640,000.

The snow depth at rail function 850 at operation 853, in some implementations, identifies the lowest train sweeping effect value (TSE-min) from among the values calculated. In this aspect, the local snow depth equation, as described herein, will be impacted only by the train which caused the least amount of snow-sweeping.

The snow depth at rail function 850 at operation 854, in some implementations, calculates a local snow depth (SDL) as a function of a previous snow depth at a previous time (SD(t−1), the current snowfall rate (SF), and the lowest train sweeping effect (TSE−min), according to the equation:

$$SDL=SD\,(t-1)+SF-TSE-\min$$

The previous time (t−1) corresponds to a current time (t) minus one increment of said predetermined time interval. For example, if the current timestamp in the audit log 220 is 2:25 PM and the predetermined time interval is fifteen minutes, then the previous time is 2:10 PM.

The snow depth at rail function 850 at operation 855, in some implementations, determines whether the calculated local snow depth (SDL) is greater than the snow-depth threshold. If such condition is true, then the heater control application 600 at operation 855, configures a heater timer to start at zero and run for a melt duration (as calculated in operation 856) and generates a first command signal that includes a start signal for the first heater. When the heater timer reaches the melt duration limit, the heater control application 600 at operation 857 generates a command signal that includes a stop signal for stopping the heater.

The heater control application 600 in some implementations includes one or more alarms that are activated to alert personnel about unexpected conditions, such as when weather data is not received or is otherwise unavailable. Under such circumstances an operator, dispatcher, administrator, or other authorized person may access and adjust the heater control application 600 as necessary.

The heater control application 600 as described herein operates in a fully autonomous mode, without the participation of any operator, dispatcher, administrator, or other person. The heater control application 600 is configured to automatically and periodically send a request for weather data, process the weather data as described herein to generate a local or hyperlocal forecast of the current conditions associated with any heater location, and then prepare and send control and command signals to each heater 30 in the network.

What is claimed is:

1. A method of controlling remote equipment, comprising:
   selecting a first heater from among a plurality of heaters, said first heater associated with a first heater location and a first train counter value;
   sending a request to a weather data application to obtain a first plurality of weather data sets, each comprising a weather station location and at least one observed condition;
   searching said first plurality of weather data sets to identify a first weather data set having a first weather station location within a first threshold distance of said first heater location; and
   transmitting a first command signal to said first heater based on said first weather data set.

2. The method of claim 1, further comprising:
   storing in an audit log said first weather data set, associated with a first timestamp;
   initiating a heater control application on a device in communication with a plurality of heaters, said device comprising a processor and a memory, wherein said heater control application comprises a weather modeling function and a melt duration function,
   wherein said weather modeling function comprises:
   generating a first local forecast associated with said first heater, wherein said first local forecast is based on said first weather data set, and wherein said first local forecast comprises said first train counter value and a first light-snow counter value;

storing said first local forecast in said audit log;

and wherein said step of transmitting a first command signal to said first heater comprises generating said first command signal based on said first local forecast.

3. The method of claim 2, wherein said first weather data set comprises a snowfall rate, a snow depth, a wind speed, and a temperature, and wherein said melt duration function comprises:

calculating a melt duration (MD) as function of said temperature (TMPF), a minimum melt duration (E1), an extended interval (E2), an anchor temperature (E3), and a step function (E4), according to the equation:

$$MD=MAX\ (E1,\ 1+E4 \times INT\ ((E3-TMPF)/E2)),$$

where INT rounds to the nearest integer and MAX selects the maximum; and returning said melt duration (MD) to said heater control application.

4. The method of claim 3, wherein said weather modeling function further comprises:

determining whether said snowfall rate is greater than a threshold snowfall intensity;

responsive to determining that said snowfall rate is greater than said threshold snowfall intensity:

(a) configuring a heater timer according to said melt duration;

(b) generating said first command signal to include a start signal to said first heater;

(c) setting said first train counter value to zero; and (d) setting said first light-snow counter value to zero.

5. The method of claim 4, wherein said weather modeling function, in response to determining that said snowfall rate is less than said threshold snowfall intensity, further comprises:

responsive to determining that said snowfall rate is both (a) greater than a light-snow threshold and (b) less than said threshold snowfall intensity;

incrementing said first train counter value by one;

incrementing said first light-snow counter value by one; and responsive to determining that said first light-snow counter value is greater than a light-snow count threshold, (a) configuring said heater timer according to said melt duration;

(b) generating said first command signal to include a start signal to said first heater.

6. The method of claim 3, wherein said weather modeling function further comprises:

determining whether said snow depth is greater than a deep-snow threshold;

determining whether said temperature is less than a first temperature threshold;

responsive to determining that (a) said snow depth is greater than said deep-snow threshold, and (b) said temperature is less than said first temperature threshold:

(a) configuring said heater timer according to said melt duration;

(b) generating said first command signal to include a start signal to said first heater;

(c) setting said first train counter value to zero; and (d) setting said first light-snow counter value to zero.

7. The method of claim 6, wherein said weather modeling function further comprises:

responsive to determining whether (a) said snow-depth is less than said deep-snow threshold and (b) said temperature is less than said second temperature threshold:

determining whether said first train counter value is greater than a train-count threshold;

determining whether said wind speed is greater than a wind threshold;

responsive to determining that (a) said number is greater than said train-count threshold, or (b) said wind speed is greater than said wind threshold:

(a) configuring said heater timer according to said melt duration;

(b) generating said first command signal to include a start signal to said first heater;

(c) setting said first train counter value to zero; and (d) setting said first light-snow counter value to zero.

8. The method of claim 6, wherein said weather modeling function further comprises:

determining whether (a) said snow-depth is less than said deep-snow threshold, (b) said temperature is less than said third temperature threshold, and (c) said first train counter value is greater than said train-count threshold;

responsive to determining that (a) said snow-depth is less than said deep-snow threshold, and (b) said temperature is less than said third temperature threshold, and (c) said first train counter value is greater than said train-count threshold:

obtaining, for each passing train associated with said first train counter value, a train velocity (V) and a train length (L);

calculating, for each said passing train, a train sweeping effect (TSE) as a function of said train velocity (V), said train length (L), a constant (C), and a switch-type value (N) associated with said first heater, according to the equation:

$$TSE=(V \times L)/(N \times C);$$

identifying a lowest train sweeping effect (TSE) from among the said train sweeping effects calculated;

calculating a local snow depth (SDL) as a function of a previous snow depth at a previous time (SD(t−1)) wherein said previous time (t−1) corresponds to a current time (t) minus one increment of said predetermined time interval, said snowfall rate (SF), and said lowest train sweeping effect (TSE−min), according to the equation:

$$SDL=SD(t-1)+SF-TSE-min$$

determining whether said local snow depth (SDL) is greater than said deep-snow threshold; and responsive to determining that said local snow depth is greater than said deep-snow threshold:

(a) configuring said heater timer according to said melt duration;

(b) generating said first command signal to include a start signal to said first heater;

(c) setting said first train counter value to zero; and (d) setting said first light-snow counter value to zero.

9. The method of claim 1, further comprising:

selecting a subsequent heater from among a plurality of heaters, said subsequent heater associated with a subsequent heater location and a subsequent train counter value;

sending a subsequent request to said weather data application to obtain a subsequent plurality of weather data sets;

searching said subsequent plurality of weather data sets to identify a subsequent weather data set characterized by a weather station location within a threshold distance of said subsequent heater location;

storing in an audit log said subsequent weather data set, associated with a subsequent timestamp;

generating a subsequent local forecast associated with said subsequent heater, wherein said subsequent local forecast is based on said subsequent weather data set, and wherein said subsequent local forecast comprises said subsequent train counter value and a subsequent light-snow counter value;

storing said subsequent local forecast in said audit log; and transmitting a subsequent command signal to said subsequent heater based on said subsequent local forecast.

10. A system for controlling remote equipment, comprising:

a weather data application configured to gather a plurality of weather data sets, each comprising a weather station location and at least one observed condition;

a server comprising a processor and a memory, said server in communication with a plurality of remote heaters;

a heater control application stored in said memory, wherein execution of said heater control application by said processor configures said server to perform operations, including operations comprising:

selecting a first heater from among a plurality of heaters, said first heater associated with a first heater location and a first train counter value;

sending a request to a weather data application to obtain a first plurality of weather data sets, each comprising a weather station location and at least one observed condition;

searching said first plurality of weather data sets to identify a first weather data set having a first weather station location within a first threshold distance of said first heater location; and transmitting a first command signal to said first heater based on said first weather data set.

11. The system of claim 10, wherein said operations further comprise:

storing in an audit log said first weather data set, associated with a first timestamp;

initiating a heater control application on a device in communication with a plurality of heaters, said device comprising a processor and a memory, wherein said heater control application comprises a weather modeling function and a melt duration function, wherein said weather modeling function comprises:

generating a first local forecast associated with said first heater, wherein said first local forecast is based on said first weather data set, and wherein said first local forecast comprises said first train counter value and a first light-snow counter value;

storing said first local forecast in said audit log;

and wherein said step of transmitting a first command signal to said first heater comprises generating said first command signal based on said first local forecast.

12. The system of claim 11, wherein said first weather data set comprises a snowfall rate, a snow depth, a wind speed, and a temperature, said operations further comprising:

calculating a melt duration according to a melt duration (MD) function, which is a function of said temperature (TMPF), a minimum melt duration (E1), an extended interval (E2), an anchor temperature (E3), and a step function (E4), according to the equation:

$$MD = MAX(E1, 1 + E4 \times INT((E3-TMPF)/E2)),$$

where INT rounds to the nearest integer and MAX selects the maximum;

returning said melt duration (MD) to said heater control application.

13. The system of claim 12, wherein said operations further comprise:

determining whether said snowfall rate is greater than a threshold snowfall intensity;

responsive to determining that said snowfall rate is greater than said threshold snowfall intensity:

(a) configuring a heater timer according to said melt duration;

(b) generating said first command signal to include a start signal to said first heater;

(c) setting said first train counter value to zero; and (d) setting said first light-snow counter value to zero.

14. The system of claim 13, wherein said operations, in response to determining that said snowfall rate is less than said threshold snowfall intensity, further comprise:

responsive to determining that said snowfall rate is both (a) greater than a light-snow threshold and (b) less than said threshold snowfall intensity;

incrementing said first train counter value by one;

incrementing said first light-snow counter value by one; and responsive to determining that said first light-snow counter value is greater than a light-snow count threshold, (a) configuring said heater timer according to said melt duration;

(b) generating said first command signal to include a start signal to said first heater.

15. The system of claim 12, wherein said operations further comprise:

determining whether said snow depth is greater than a deep-snow threshold;

determining whether said temperature is less than a first temperature threshold;

responsive to determining that (a) said snow depth is greater than said deep-snow threshold, and (b) said temperature is less than said first temperature threshold:

(a) configuring said heater timer according to said melt duration;

(b) generating said first command signal to include a start signal to said first heater;

(c) setting said first train counter value to zero; and (d) setting said first light-snow counter value to zero.

16. The system of claim 15, wherein said operations further comprise:

responsive to determining whether (a) said snow-depth is less than said deep-snow threshold and (b) said temperature is less than said second temperature threshold:

determining whether said first train counter value is greater than a train-count threshold;

determining whether said wind speed is greater than a wind threshold;

responsive to determining that (a) said number is greater than said train-count threshold, or (b) said wind speed is greater than said wind threshold:

(a) configuring said heater timer according to said melt duration;

(b) generating said first command signal to include a start signal to said first heater;

(c) setting said first train counter value to zero; and (d) setting said first light-snow counter value to zero.

17. The system of claim 15, wherein said operations further comprise:
- determining whether (a) said snow-depth is less than said deep-snow threshold, (b) said temperature is less than said third temperature threshold, and (c) said first train counter value is greater than said train-count threshold;
- responsive to determining that (a) said snow-depth is less than said deep-snow threshold, and (b) said temperature is less than said third temperature threshold, and (c) said first train counter value is greater than said train-count threshold:
- obtaining, for each passing train associated with said first train counter value, a train velocity (V) and a train length (L);
- calculating, for each said passing train, a train sweeping effect (TSE) as a function of said train velocity (V), said train length (L), a constant (C), and a switch-type value (N) associated with said first heater, according to the equation:

$$TSE=(V \times L)/(N \times C);$$

- identifying a lowest train sweeping effect (TSE) from among the said train sweeping effects calculated;
- calculating a local snow depth (SDL) as a function of a previous snow depth at a previous time (SD(t−1)) wherein said previous time (t−1) corresponds to a current time (t) minus one increment of said predetermined time interval, said snowfall rate (SF), and said lowest train sweeping effect (TSE−min), according to the equation:

$$SDL = SD(t-1) + SF - TSE_{min}$$

- determining whether said local snow depth (SDL) is greater than said deep-snow threshold; and
- responsive to determining that said local snow depth is greater than said deep-snow threshold:
  - (a) configuring said heater timer according to said melt duration;
  - (b) generating said first command signal to include a start signal to said first heater;
  - (c) setting said first train counter value to zero; and
  - (d) setting said first light-snow counter value to zero.

18. The system of claim 1, wherein said operations further comprise:
- selecting a subsequent heater from among a plurality of heaters, said subsequent heater associated with a subsequent heater location and a subsequent train counter value;
- sending a subsequent request to said weather data application to obtain a subsequent plurality of weather data sets;
- searching said subsequent plurality of weather data sets to identify a subsequent weather data set characterized by a weather station location within a threshold distance of said subsequent heater location;
- storing in an audit log said subsequent weather data set, associated with a subsequent timestamp;
- generating a subsequent local forecast associated with said subsequent heater, wherein said subsequent local forecast is based on said subsequent weather data set, and wherein said subsequent local forecast comprises said subsequent train counter value and a subsequent light-snow counter value;
- storing said subsequent local forecast in said audit log; and
- transmitting a subsequent command signal to said subsequent heater based on said subsequent local forecast.

19. A non-transitory processor-readable storage medium that stores processor-executable instructions that, when executed by a processor of a machine, cause said machine to perform operations comprising:
- initiating a heater control application on a device in communication with a plurality of heaters, said device comprising a processor and a memory, wherein said heater control application comprises a weather modeling function and a melt duration function;
- selecting a first heater associated with a first heater location;
- sending a series of requests according to a predetermined time interval to obtain said plurality of weather data sets, each associated with a timestamp, a weather station location and comprising at least one observed condition;
- storing each of said plurality of weather data sets in an audit log according to said timestamp;
- searching said plurality of weather data sets to identify a first weather data set having a first weather station location within a first threshold distance of said first heater location;
- generating a first local forecast associated with said first heater according to said weather modeling function, wherein said first local forecast is based on said first weather data set; and
- transmitting a first command signal to said first heater based on said first local forecast.

20. The non-transitory processor-readable storage medium of claim 19, wherein said weather modeling function further comprises:
- determining whether said snowfall rate is greater than a threshold snowfall intensity;
- responsive to determining that said snowfall rate is greater than said threshold snowfall intensity:
  - (a) configuring a heater timer according to said melt duration;
  - (b) generating said first command signal to include a start signal to said first heater;
  - (c) setting said first train counter value to zero; and
  - (d) setting said first light-snow counter value to zero.

* * * * *